Patented May 21, 1929.

1,714,249

UNITED STATES PATENT OFFICE.

WILLIAM SMITH AND JOHN THOMAS, OF GRANGEMOUTH, SCOTLAND, ASSIGNORS TO SCOTTISH DYES, LIMITED, OF GRANGEMOUTH, SCOTLAND.

PROCESS OF PREPARING FLAVANTHRONE.

No Drawing. Application filed May 16, 1927, Serial No. 191,927, and in Great Britain May 26, 1926.

This invention relates to the production of anthraquinone derivatives which may be used as dyestuff intermediates or for the purposes of dyeing and printing.

It has for its principal object to provide a process for the conversion of anthraquinone derivatives into flavanthrone or like products.

To that end we have made experiments and as a result have found among other things that if anthraquinone derivatives, particularly 1-halogen-2-amino derivatives, are converted into 1-halogen-2-urethane derivatives they may then be transferred smoothly into the corresponding flavanthrone type products.

We have also found that if the conditions for the condensation of two molecules of 1-halogen-2-urethane-anthraquinone derivatives are less drastic, a product is formed which we regard as 1.1'-dianthraquinonyl-2.2'-diurethane derivative. Dianthraquinonyl bodies of this character furnish valuable dyestuff intermediate products and usually may be readily purified and smoothly converted by a variety of methods into flavanthrone derivatives.

The invention consists in the conversion of 1-halogen-2-urethane derivatives of anthraquinone into flavanthrone or its derivatives by treating the halogen-urethane derivatives with a metal with or without a diluent.

The invention also consists in carrying out the conversion of a urethane compound into the flavanthrone derivative as indicated above by dry baking with finely divided metal.

The invention also consists in carrying out the conversion of a urethane compound into the flavanthrone compound as indicated above in suspension in nitro-benzene or the like, for example naphthalene.

The invention also consists in a process comprising the condensation of 1-halogen-2-urethane derivatives of anthraquinone to form flavanthrone or its derivatives by means of a metal with or without a diluent.

The invention also consists in a process for the formation of 1.1'-dianthraquinonyl-2.2'-diurethane derivatives by the condensation of two molecules of 1-halogen-2-urethane-anthraquinone derivatives and the conversion of the products into flavanthrone derivatives for example directly or in stages.

The invention also consists in an improvement in or modification of the processes of the preceding five paragraphs according to which by effecting condensation at a temperature lower than that required for the formation of flavanthrone bodies which may be regarded as of the dianthraquinonyl type are produced.

The invention includes the extraction or purification of dianthraquinonyl-diurethane condensation products prepared as indicated above by means of organic solvents, for example mono-chlor-benzol.

The invention includes a modified method of working up the reaction mixture, filtration of the mixture whilst hot, whereby the dianthraquinonyl diurethane may be separated from copper and flavanthrone by reason of its solubility in the hot solvent.

The invention also consists in a method comprising the hydrolysis of dianthraquinonyl-diurethane products prepared as indicated above, for example in the presence of concentrated sulphuric acid.

The invention also consists in the treatment with alcoholic potash of dianthraquinonyl-diurethane bodies prepared as above, whereby hydrolysis is effected and flavanthrone formed.

The invention also consists in processes and products substantially as herein described.

The following examples illustrate how the invention may be carried into effect, all parts being parts by weight:—

Example 1.

According to this example 100 parts of the urethane compound obtained by the reaction of ethyl chlor-formate on 1-chlor-2-amino-anthraquinone are suspended in 400 parts of nitro-benzene. There is then added 66 parts of copper and the contents are heated to boiling and kept at this temperature until no further formation of flavanthrone takes place. After the reaction is complete the contents are cooled and diluted with a further 400 parts of nitro-benzene. It is then filtered, the crude flavanthrone being obtained mixed with excess copper, from which it can be separated by the usual processes, for example, vatting with alkaline hydrosulphite or alternatively extracted with cold strong sulphuric acid.

We regard the mechanism of the reaction as condensation of the anthraquinone body to a body of the type 1:1'-dianthraquinonyl, followed by hydrolysis of the carbethoxy group, the resulting dianthraquinonyl-diamido body further condensing to the flavanthrone derivative.

The most probable reaction may be expressed as follows:

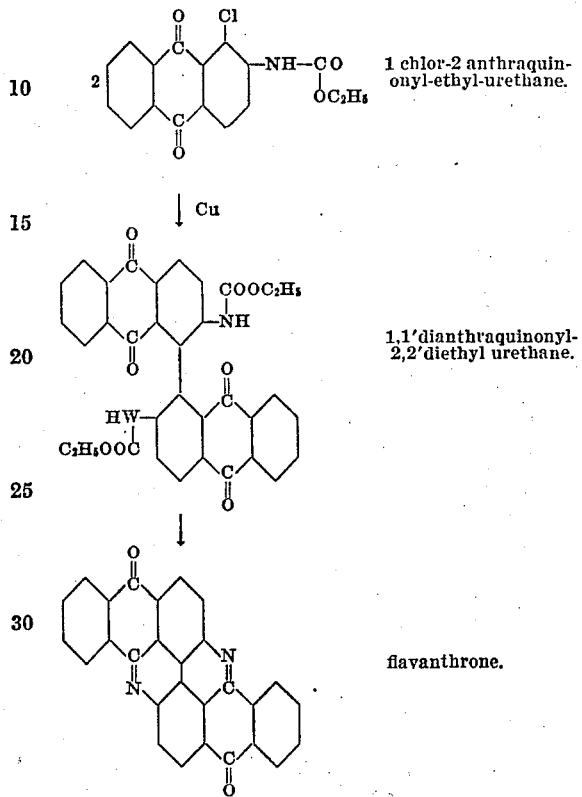

*Example 2.*

According to this example 20 parts of ethyl urethane prepared from 1-chlor-2-amino-anthraquinone and ethyl chlor-formate are suspended in 80 parts of nitro-benzene and 8 parts of copper powder are added to the mixture. The contents are well stirred and the melt heated at 160° for several hours. At the end of this time the mixture is cooled down and filtered. There is thus obtained what we regard as crude dianthraquinonyl-2-2'-diurethane mixed with copper and any flavanthrone that has been formed.

This dianthraquinonyl-diurethane is readily extracted from this crude product by treatment with an organic solvent, for example mono-chlor-benzol, from which it crystallizes on concentration in magnificent glistening yellow plates which melt above 250° C.

*Example 3.*

An alternative method of working up the reaction mixture is to filter at about 160° C., after the reaction is completed. There is thus left behind on the filter apparently any flavanthrone that may have been formed, as well as the unchanged copper and salts of copper. The filtrate, on cooling, deposits the aforesaid dianthraquinonyl-diurethane in a purified form.

*Example 4.*

The new product can be crystallized from a variety of solvents and it can be converted into flavanthrone derivatives in many ways.

*Example 5.*

As a case of Example 4, if 10 parts of dianthraquinonyl-diurethane prepared as described above, are dissolved in 100 parts of concentrated sulphuric acid, and the melt heated up to 120–130° C. for a short time, the urethane body is hydrolyzed and on pouring the sulphuric acid solution into water flavanthrone is obtained and forms a reddish-orange paste.

*Example 6.*

Another method of converting the dianthraquinonyl-diurethane to flavanthrone derivative is to treat the "diurethane" with alcoholic potash. If the material is dry baked or heated to a high temperature in an inert solvent, some of it can also be changed into a flavanthrone derivative.

*Example 7.*

This example illustrates the employment of an inert solvent comprising napthalene.

According to this example 20 parts of 1-chlor-2-urethane anthraquinone are mixed with 80 parts of napthalene and, after warming to 100°, 8 parts of copper powder are added. The mixture is then well stirred and boiled for several hours. 80 parts of nitro-benzene are then added and after cooling to 50° the product is filtered off and washed with nitro-benzene and methylated spirits.

*General.*

Modifications may be made in the processes described above; for instance urethanes other than those mentioned may be employed, for example those obtained by the action of butyl-chlor-formate or phenyl-chlor-formate on 1-chlor-2-amino-anthraquinone. Instead of 1-chlor-2-amino-anthraquinone, the corresponding brom derivative can be used. Other derivatives and higher halogenated amino-chlor-anthraquinones containing the grouping 1-halogen-2-amino-anthraquinone can be used for example 1-3-dibrom-2-amino-anthraquinone.

The condensation can be carried out in other media besides nitro-benzene for example napthalene as indicated above and in some cases the reaction can be caused to proceed by dry baking for example in the manner described.

Dianthraquinonyl-diurethane prepared as described above usually dissolves in alkaline hydrosulphite with a red vat but this vat does not dye cotton and the colour of this vat distinguishes it from flavanthrone which gives royal blue vat.

Various 1-halogen-2-amino-anthraquinone derivatives referred to above may be treated according to the present invention by processes such as those indicated.

The conversion of 1-halogen-2-urethane anthraquinone derivatives to flavanthrone may be effected directly at a high temperature in an inert solvent in the presence of a finely divided metal such as copper, or the process may be carried out in two stages as indicated above when the process is stopped at a point where the 1.1'-dianthraquinonyl-2.2'-diurethane derivative has been prepared. This derivative may then be purified, if necessary, and afterwards converted by the methods described to the flavanthrone derivatives.

The 1.1'-dianthraquinonyl-2.2'-diurethane derivatives may be converted into the flavanthrone derivatives by any of the following treatments:—
(1) Heating in sulphuric acid.
(2) Heating in alcoholic potash.
(3) Dry baking.
(4) Heating at a high temperature in an inert solvent.

The process for forming flavanthrone derivatives direct from the 1-halogen-2-urethane anthraquinone derivatives can be carried out
(1) By heating at a high temperature in an inert solvent in the presence of a finely divided metal such as copper.
(2) By dry baking with a finely divided metal such as copper.

Having now described our invention what we claim as new and desire to secure by Letters Patent is:—

1. A process for the conversion of a 1 halogen-2 anthraquinonyl urethane compound into flavanthrone which comprises heating said compound with finely divided copper.

2. A process for the conversion of a 1 halogen-2 anthraquinonyl urethane compound into flavanthrone which comprises heating said compound with finely divided copper in the presence of an inert diluent.

3. A process for the conversion of a 1 chlor-2 anthraquinonyl urethane compound into flavanthrone which comprises heating said compound with finely divided copper.

4. A process for the conversion of a 1 chlor-2 anthraquinonyl urethane compound into flavanthrone which comprises heating said compound with finely divided copper in the presence of an inert diluent.

In testimony whereof we have signed our names to this specification.

WILLIAM SMITH.
JOHN THOMAS.